Patented June 22, 1943

2,322,565

UNITED STATES PATENT OFFICE 2,322,565

COMPOSITION FOR THE TREATMENT OF IVY POISONING

Robert M. Cole, Bryn Athyn, Pa.

No Drawing. Application September 8, 1939, Serial No. 293,920

2 Claims. (Cl. 167—58)

This invention relates to a composition for treating ivy poisoning.

The active oil of the poison ivy plant (*Rhus toxicodendron*) exhibits the characteristics of a chemical virus, i. e., a giant type of protein molecule manifesting all the destructive properties of colonizing bacteria including parthenogenesis. This type of protein, enlarging at the expense of the skin proteins, in enhancing itself by absorption of the latter, destroys the cells with the consequent itching and discomfort common to ivy poisoning.

I have found that rapid and effective treatment of ivy poisoning results from application to the affected areas of a composite of a protein and a protein builder, usually and preferably mixed with water. The protein and the protein builder serve to satisfy and saturate the virus protein, this being a vigorous reaction which upsets the normal behavior of the virus molecule, in consequence of which its growth ceases.

A moderate amount of the composition should be applied to the affected areas of the skin and rubbed to ensure penetration and until an opaque lather appears. Upon exposure to the air for a few minutes the lather dries in the form of a thin flexible skin.

The itching characteristic of ivy poisoning ceases as soon as the composition has dried on the skin, and in most cases effective expunging of the virus takes place in from about one to two days.

The protein and protein builder selected for use should be such as may be incorporated in a homogeneous mixture, and also such as not to have a poisonous effect when applied to the skin.

As examples of proteins suitable for the purpose, may be mentioned egg albumen and milk casein. The latter I found to be particularly effective.

As protein builders, amines, in general may be used, the following being indicative of the classes which are suitable:

Enol-amines, such as ethanolamine
Alkyl-amines, such as ethylamine
Amino acids, such as alanine
Amides, such as urea I have found urea to be especially suitable.

My preferred composition for treating ivy poisoning is as follows:

| | Ounces, about— |
|---|---|
| Water | 16 |
| Urea | 16 |
| Casein | 7½ |

Insofar as the action on the virus molecule is concerned, substantial variation in the proportions of the protein and protein builder are permissible. This is also true of the amount of water used. However, from the standpoint of manufacture, sale and use, the foregoing proportions are quite important. For instance, if the amount of urea is noticeably increased or the amount of casein noticeably reduced, crystallization of urea will occur. Additionally, if the quantity of urea is reduced substantially in comparison with the amount of casein, the preservative action thereof with reference to the casein will be found to be insufficient to prevent deterioration of the casein over any reasonably extended period of time.

On the other hand, substantial decrease in the amount of urea with respect to casein is disadvantageous, since the film which forms on the skin upon drying of the composition will be found to be excessively brittle, as a result of which it will crack as the skin is flexed on the affected areas.

In some instances, as a result of blistering or scratching, the skin of the affected areas becomes broken and secondary poisoning or infection takes place. With this in mind, the composition may also be prepared to incorporate a small percentage of salts, such as those of iron, lead, mercury or silver. Where used, such salts should be present in amounts from a trace up to about one percent.

In using the term "composition" herein and in the appended claims, it is not to be understood that the ingredients are necessarily in chemically combined relation.

I claim:

1. A composition for treating ivy poisoning containing water, urea and casein.

2. A composition for treating ivy poisoning containing the following ingredients in the proportions indicated:

| | Ounces, about— |
|---|---|
| Water | 16 |
| Urea | 16 |
| Casein | 7½ |

ROBERT M. COLE.